(12) United States Patent
Schwarz et al.

(10) Patent No.: US 8,239,325 B2
(45) Date of Patent: Aug. 7, 2012

(54) METHOD AND SYSTEM TO VERIFY THE IDENTITY OF A USER

(75) Inventors: Michael A. Schwarz, Thousand Oaks, CA (US); Gregory M. Calcagno, San Jose, CA (US); Mark E. Snycerski, San Jose, CA (US); Joseph M Lynam, Cupertino, CA (US); Jennifer R. Truitt, Campbell, CA (US); Brad S. Singer, Sudbury, MA (US); Donald R. Teague, Jr., Campbell, CA (US)

(73) Assignee: PaymentOne Corporation, San Jose, CA (US)

( * ) Notice: Subject to any disclaimer, the term of this patent is extended or adjusted under 35 U.S.C. 154(b) by 0 days.

(21) Appl. No.: 11/655,647

(22) Filed: Jan. 18, 2007

(65) Prior Publication Data

US 2008/0178260 A1    Jul. 24, 2008

(51) Int. Cl.
*G06Q 40/00* (2012.01)

(52) U.S. Cl. .............. 705/44; 705/35; 705/39; 705/50; 705/64; 705/72; 705/75; 705/78

(58) Field of Classification Search ............. 705/35, 705/44, 50
See application file for complete search history.

(56) References Cited

U.S. PATENT DOCUMENTS

| | | | | |
|---|---|---|---|---|
| 6,227,447 | B1* | 5/2001 | Campisano | 235/380 |
| 6,754,346 | B2* | 6/2004 | Eiserling et al. | 380/202 |
| 6,836,765 | B1 | 12/2004 | Sussman | |
| 6,862,610 | B2 | 3/2005 | Shuster | |
| 6,907,135 | B2 | 6/2005 | Gifford | |
| 6,957,185 | B1 | 10/2005 | Labaton | |
| 6,968,457 | B2 | 11/2005 | Tam | |
| 6,993,507 | B2 | 1/2006 | Meyer et al. | |
| 7,162,475 | B2 | 1/2007 | Ackerman | |
| 2001/0039592 | A1* | 11/2001 | Carden | 709/245 |
| 2002/0083008 | A1 | 6/2002 | Smith et al. | |
| 2002/0095576 | A1* | 7/2002 | Stoltz et al. | 713/175 |
| 2002/0143655 | A1* | 10/2002 | Elston et al. | 705/26 |
| 2002/0152123 | A1* | 10/2002 | Giordano et al. | 705/14 |
| 2003/0046235 | A1* | 3/2003 | Lacivita et al. | 705/44 |
| 2004/0022380 | A1* | 2/2004 | Lynam et al. | 379/207.13 |
| 2004/0123162 | A1* | 6/2004 | Antell et al. | 713/202 |
| 2006/0026043 | A1* | 2/2006 | Schneider et al. | 705/3 |
| 2007/0022293 | A1 | 1/2007 | Hayashi et al. | |
| 2007/0038581 | A1* | 2/2007 | Keresman et al. | 705/64 |
| 2008/0175360 | A1 | 7/2008 | Schwarz et al. | |
| 2008/0175367 | A1 | 7/2008 | Schwarz et al. | |

OTHER PUBLICATIONS

"U.S. Appl. No. 11/836,686, Non-Final Office Action mailed Jul. 18, 2008", 20 pgs.
"U.S. Appl. No. 11/953,783, Non-Final Office Action mailed Jul. 18, 2008", 20 pgs.
"U.S. Appl. No. 11/836,686, Final Office Action mailed Jan. 27, 2009", 23 pgs.
"U.S. Appl. No. 11/836,686, Response filed Oct. 20, 2008 to Non-Final Office Action mailed Jul. 18, 2008", 16 pgs.

* cited by examiner

*Primary Examiner* — Elizabeth Rosen
(74) *Attorney, Agent, or Firm* — Morgan, Lewis & Bockius LLP

(57) ABSTRACT

A method and system to verify the identity of a user are described. The system may include a communications module to receive a billing telephone number and a private data segment associated with a user; an address detector to obtain a street address associated with the user; a private data processor to obtain one or more identification records, utilizing the obtained street address and the private data segment; and a matching module to compare the one or more identification records with the private data segment associated with the user to generate a match result.

22 Claims, 6 Drawing Sheets

500

| REQUEST_TRANSACTION.ACCT_ID | ~502 |
| REQUEST_TRANSACTION.CLIENT_ID | ~504 |
| REQUEST_TRANSACTION.BTN | ~506 |
| REQUEST_TRANSACTION.BTN_VAL | ~508 |
| REQUEST_TRANSACTION..L4SSN | ~510 |
| REQUEST_TRANSACTION.ADDR_RULE | ~512 |

*FIG. 5*

METHOD AND SYSTEM TO VERIFY THE IDENTITY OF A USER

TECHNICAL FIELD

This application relates to a method and system to verify the identity of a user.

BACKGROUND

While electronic commerce (e-commerce) marketplace may provide a powerful online platform for the sale of goods and services by a community of individuals and small businesses, online fraud remains a source of significant concern. As consumers continue to demand a streamlined experience online, they may become frustrated by instructions to disclose private financial information at every point of purchase. Some existing verification approaches rely on requiring a user to initiate a telephone call to a transaction processing facility or to respond to an inbound call with an authorization code. These methods may not always be convenient for users.

BRIEF DESCRIPTION OF DRAWINGS

Embodiments of the present invention are illustrated by way of example and not limitation in the figures of the accompanying drawings, in which like reference numbers indicate similar elements and in which:

FIG. 5 is a diagrammatic representation of an example data structure to represent an identity verification request, in accordance with an example embodiment.

DETAILED DESCRIPTION

The method to verify the identity of a user (or to authenticate a user) and an identity verification system (IVS) are described. In the context of the electronic commerce (e-commerce) marketplace, IVS may be utilized advantageously to reduce online fraud by providing merchants with a tool to confirm the identity of a user who is attempting to complete an online purchase for a digital good or service. The identity verification system, in one example embodiment, is configured to offer a high degree of confidence to the merchant of a consumer's identity while minimizing the stress for the consumer. In one example embodiment, user's identity is be verified using self-reported data elements that include personal data associated with the user that is not publicly available, e.g., the last four or all nine digits of the user's social security number (SSN), an eight digit date of birth, a portion of the user's driver's license number, a certified electronic mail (email) address, etc. An item of personal data of the user that is not publicly available, or a portion of such private data, may be referred to as a private data segment of a user. The self-reported data elements may be utilized, in one example embodiment, to confirm that the user has a relationship to the chosen payment instrument, e.g., that the user is in control of the billing telephone number (BTN) in a scenario where the user selected a phone bill as the payment method.

Identity verification system, in one example embodiment, may be utilized advantageously with alternative payment options including electronic check, direct invoicing, credit card or other card-alternative payment methods. The method and system to verify the identity of a user may be implemented in the context of a network environment. An example network environment 100 is illustrated in FIG. 1.

Figure 1:
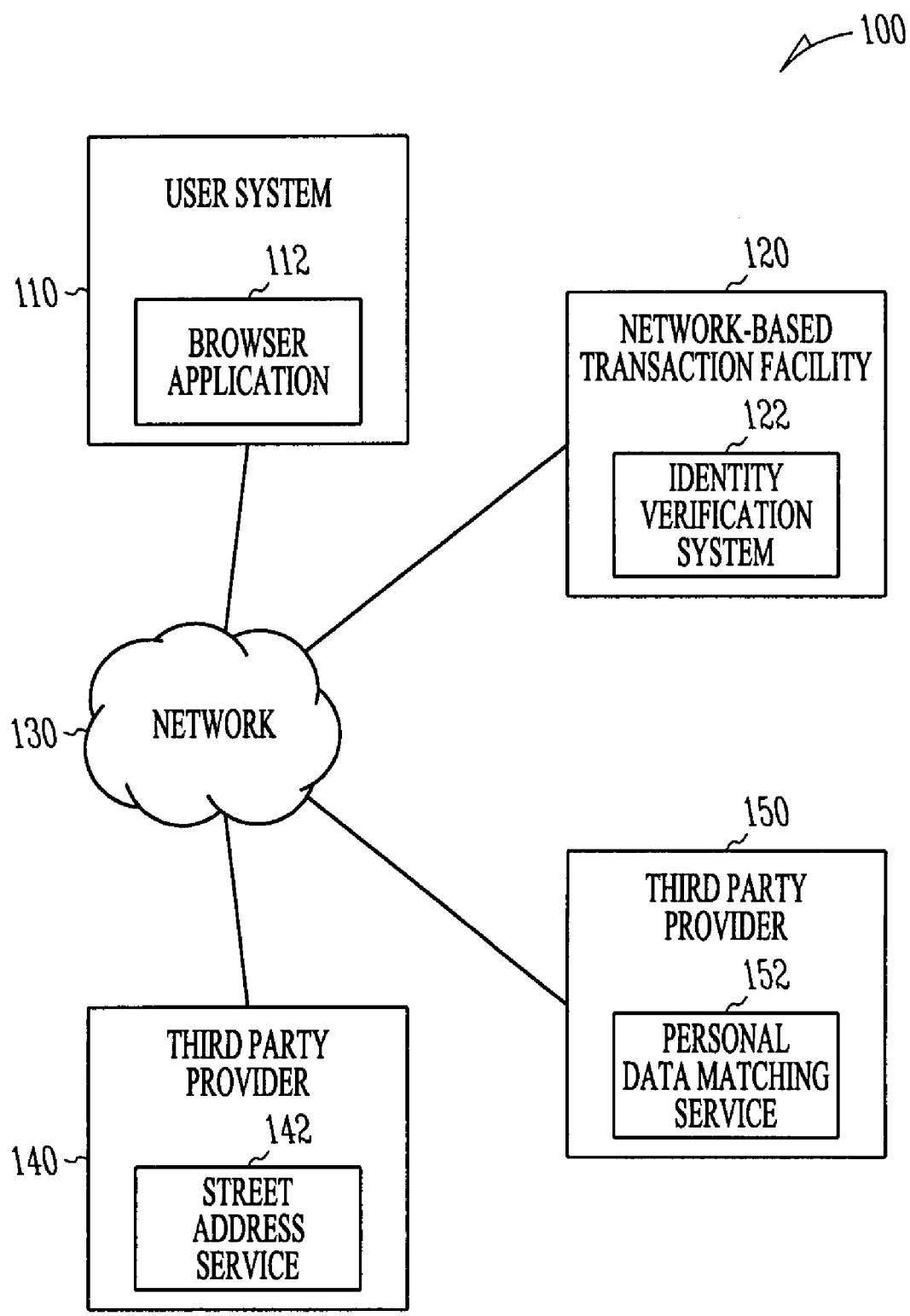
FIG. 1 is a diagrammatic representation of a network environment within which an example embodiment may be implemented.

As shown in FIG. 1, the network environment 100 may include a user system (e.g., a system associated with a consumer or a merchant) 110 and a network-based transaction facility 120. The user system 110 may run a browser application 112 and may have access to the network-based transaction facility 120 via a communications network 130. The communications network 130 may be a public network (e.g., the Internet, a wireless network, etc.) or a private network (e.g., LAN, WAN, Intranet, etc.).

A user may utilize the browser 112 running on the user system 110 to access services provided by the network-based transaction facility 120. One of the services provided by the network-based transaction facility 120 is an identity verification system 122. The identity verification system 122 may be configured to receive a billing telephone number and a personal data segment associated with a user and, based on this information, determine whether the user can be successfully authenticated. The facility 120 may also host a system to provide to users (e.g., to merchants) a payment method verification service (not shown) that may be utilized in conjunction with the identity verification system 122, as described further below with reference to FIG. 4. The identity verification system 122 may be configured to utilize services that are located remotely with respect to the network-based transaction facility 120. Such external services may include, for example, a street address service 142 that may be hosted by a third party provider system 140, and a personal data matching service 152 that may be hosted by a third party provider system 150. An example identity verification system may be described with reference to FIG. 2.

Figure 2:
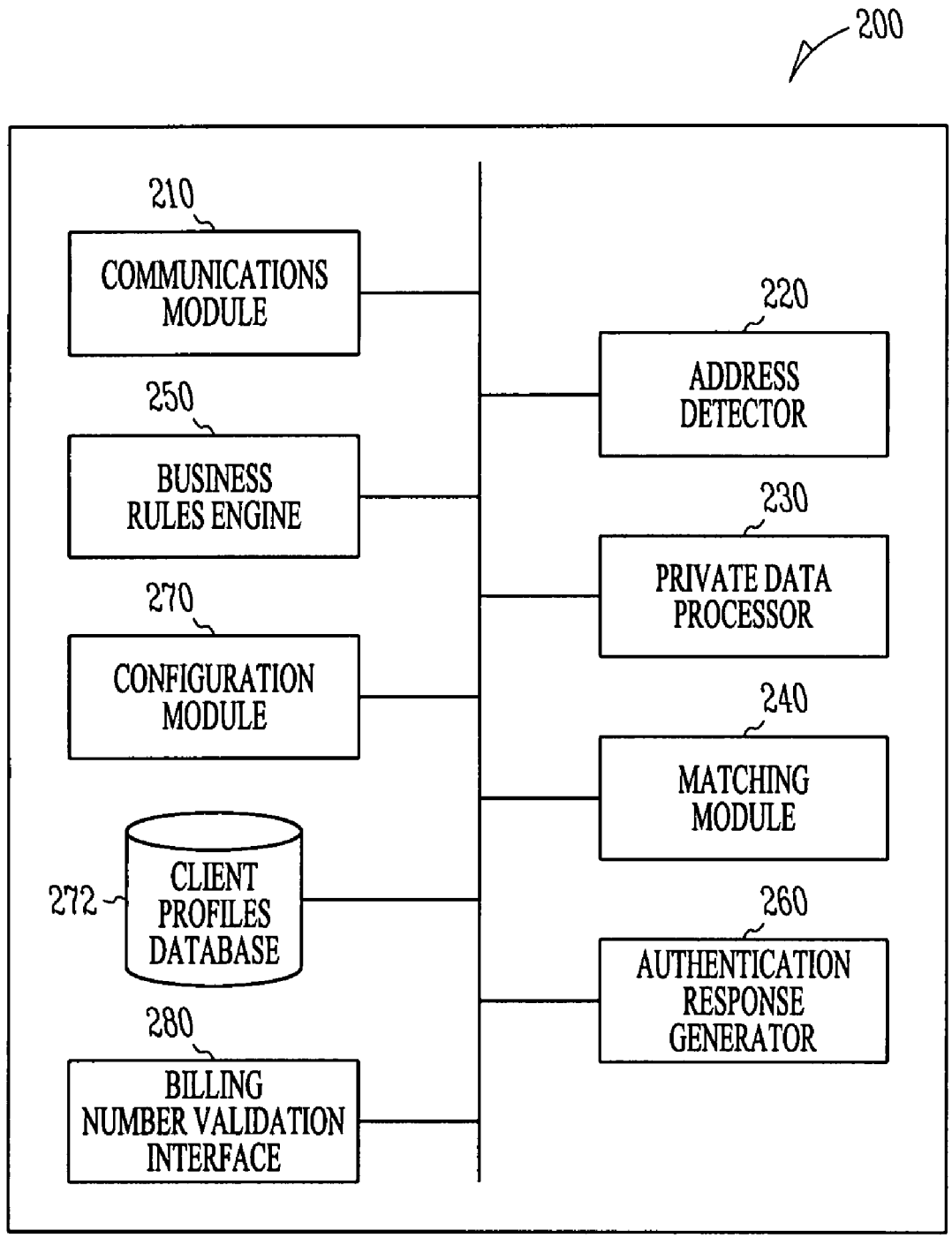
FIG. 2 is a block diagram of a system to verify the identity of a user, in accordance with an example embodiment.

FIG. 2 is a block diagram of an example identity verification system 200, in accordance with one example embodiment. The example identity verification system 200 may include a communications module 210, an address detector 220, a private data processor 230, a matching module 240, a business rules engine 250, and an authentication response generator 260. The example identity verification system 200 may also include a billing number validation interface 280 to facilitate utilization of the identity verification system 200 in conjunction with a subscriber line validation system. It will be noted that, in some example embodiment, the identity verification system 200 may include one or more modules to provide an interface with other payment verification systems in addition to or instead of the billing number validation interface 280. Some examples of other payment verification systems include a credit card verification system, a mobile phone validation interface, an automatic clearinghouse (ACH), etc.

The communications module 210 may be configured to receive, from a client (e.g., a merchant requesting the identity verification system 200 to verify the identity of a user) a billing telephone number and a private data segment associated with a user who is the subject of an identity verification request. As mentioned above, a private data segment associated with a user may include various items of personal information associated with the user that is not publicly available. A private data segment may include, for example, some or all of the digits of the social security number of a user, short message service (SMS) information, customer code, out of wallet type questions (e.g., the user's date of birth, the user's driver's license number, etc.), voice capture, electronic Letter of Agency (eLOA), a certified email, and an association of the user's Internet protocol (IP) address with the user's street address.

The address detector 220 may be configured to forward the billing telephone number information to a third party provider (e.g., to the third party provider 140 hosting a street address service 142) and to obtain a street address associated with the billing telephone number. The private data processor 230 may be utilized to forward the obtained street address to another third party provider (e.g., to the third party provider 150 hosting the personal data matching service 152) along with the private data segment associated with the user and to obtain in response one or more identification records associated with the street address and the private data segment. In one example embodiment, the private data processor 230 is configured to accept from a third party provider a predetermined maximum number of identification records that have been determined to most closely match the street address and the private data segment. The personal data matching service 152 may also communicate to the private data processor 230 that there are no records available that sufficiently match the provided street address and the private data segment.

The matching module 240, in one example embodiment, may be configured to compare the identification records (if any) obtained from the personal data matching service 152 with the data segment associated with the user to generate a match result. The business rules engine 250 may be utilized in cooperation with the matching module 240 to determine whether the match result corresponds to a positive authentication of the user or to a negative (or failed) authentication. For example, where the private segment data is the last four digits of the user's social security number, a match result including an exact match of the street address and a partial match of the last four digits of the user's social security number (e.g., three out of four matching digits) may be identified by the matching module 240 as an acceptable match that should result in a positive authentication of the user. In another example embodiment, the business rules engine 250 may be configured to require an exact match between the private data segment received from the user and the data exhibited in an identification record provided by the personal data matching service 152. The authentication criteria utilized by the matching module 240 and the business rules engine 250 may be configurable, e.g., by utilizing a configuration module 270, based on a profile of a client (e.g., a merchant) who is requesting the identity of a user to be verified. The profiles may be stored in a client profiles database 272.

The match result generated by the matching module 240 may be utilized by the authentication response generator 260 to generate an authentication message based on the match result. In some example embodiments, if t the matching module 240 generated a match result indicative of a failed authentication of the user, the communications module (or another module configured to perform such function) may automatically initiate an alternative identity verification procedure. An alternative identity verification procedure may include, for example, automatically initiating a telephone call to the billing telephone number or requesting the user to initiate a telephone call to a telephone number associated with the network-based transaction facility 120 of FIG. 1. An example method to verify the identity of a user can be described with reference to FIG. 3.

Figure 3:
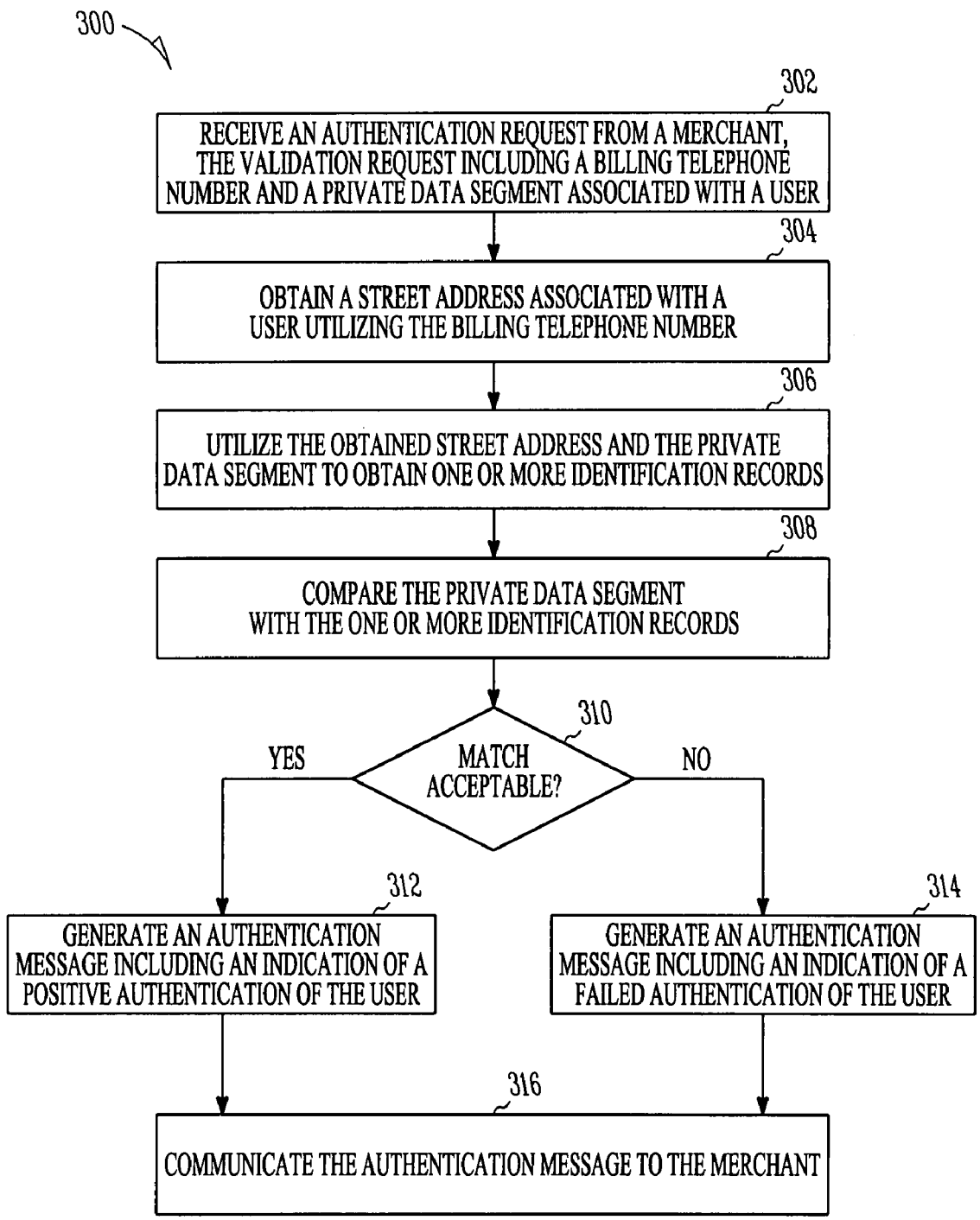
FIG. 3 a flow chart of a method to verify the identity of a user, in accordance with an example embodiment.

FIG. 3 is a flow chart of a method 300 to verify the identity of a user, according to one example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the identity verification system 200 illustrated in FIG. 2. The method 300 may be performed by the various modules discussed above with reference to FIG. 2. Each of these modules may comprise processing logic.

As shown in FIG. 3, at operation 302, the communications module 210 of the identity verification system 200 receives a billing telephone number and a private data segment associated with a user. The billing telephone number is forwarded to a third party provider in order for the address detector 220 to obtain, at operation 304, a street address associated with the billing telephone number. The private data processor 230 forwards the obtained street address to another third party provider hosting a personal data matching service (e.g., the personal data matching service 152 of FIG. 1) in order to obtain, at operation 306, one or more identification records. In one example embodiment, the identity verification system 200 may be configured to permit a predetermined maximum number of identification records to be received by private data processor 230 from the personal data matching service 152. Each of the received identification records may be associated with the street address obtained by the address detector 220.

If the address detector 220 fails to obtain the street address associated with the billing telephone number, a message may be sent back to the business rules engine 250 to automatically initiate another, alternative, identity verification method, e.g., via initiating a telephone call to the user or via receiving a telephone call from the user.

It will be noted that, in some example embodiments, the street address may be provided to the identity verification system 200 via the communications module 210, e.g., from a merchant requesting to verify the identity of the user. The operation 304 of obtaining the street address from a third party may be then omitted. Instead, the street address received by the communications module 210 may be forwarded to a third party provider hosting a personal data matching service to obtain one or more identification records.

At operation 308, the matching module 240 compares the identification records obtained from the personal data matching service 152 with the data segment associated with the user in order to generate a match result. If it is determined, at operation 310, that the generated match result corresponds to a positive authentication of the user (the match result is acceptable), the authentication response generator generates an authentication message including an indication of a positive authentication of the user, at operation 312. If it is determined, at operation 310, that the generated match result corresponds to a negative or a failed authentication of the user (the match result is not acceptable), the authentication response generator generates an authentication message including an indication of a negative authentication of the user, at operation 314. At operation 316, the authentication message is communicated to a merchant who is the source of the initial authentication request.

In some example embodiments, if the matching module 240 fails to obtain any identification records the personal data matching service 152 or if the generated match result corresponds to a failed authentication of the user, a message may be sent to the business rules engine 250 to automatically initiate another, alternative, identity verification method, e.g., via initiating a telephone call to the user or via receiving a telephone call from the user.

As mentioned above, example method and system to verify the identity of a user described with reference to FIG. 2 and FIG. 3 may be utilized advantageously with a payment method verification service. A payment method verification service, in one example embodiment, may be implemented as a subscriber line validation system. A subscriber line may be a telephone line or the like, which a consumer or a business may obtain from a telephone company, a local exchange carrier (LEC), or a Mobile Operator. Line data, e.g., a billing telephone number (BTN), may be used to validate the subscriber line. The BTN may be used to investigate various databases in order to obtain an indication of the credit worthiness of the subscriber account associated with the subscriber line.

A subscriber line validation system may include an application program interface (API) connected to a vendor or service provider (collectively referred to as a merchant). A merchant may request the validation of the subscriber line prior to concluding an electronic transaction with a subscriber (e.g., a consumer or a business) via the subscriber line. It is, however, to be appreciated that the API may be connected to a variety of different hosts or clients which require validation of a subscriber line via which the merchant may carry out transactions for goods and/or services.

In one exemplary embodiment, a subscriber line validation system is connected to a plurality of merchants which conduct transactions with users via line termination equipment such as a telephone, a personal computer or the like. Such merchants, when conducting transactions, may preferably charge a user for their services by adding such charges to a telephone account of the user rather than charging the goods and/or services to a credit card, debit card, or the like. Accordingly, the validation of the subscriber line, and the subscriber account associated with the subscriber line, may be of benefit to the merchant prior to completing a transaction. The validation may include determining whether or not the subscriber line associated with the billing telephone number is a billable line and, accordingly, the subscriber account associated with the subscriber line may thus be billed for the transaction.

In one exemplary embodiment, a merchant communicates a request to the system and forwards the billing telephone number to the network-based transaction facility that hosts a subscriber line validation system. The subscriber line validation system then processes the information received from the merchant and provides a validation status, e.g. a code indicating that the subscriber line number is a valid billable number or a code indicating that the subscriber line number is not a valid billable number.

The subscriber line validation system may include a comparator module, a threshold database, an OFFNET database, an ONNET database, a competitive local exchange carrier (CLEC) database, a 42 BLOCK database, a block and cancel database, an unbilled and/or unpaid bills database, line identification database (LIDB), a validity check module, a regional account office (RAO) database, an operating company number (OCN) database, an ONNET database, an address verification database, a customer account record exchange (CARE) results database, an Automatic Number Identification (ANI) watch database, and an NPA (Numbering Plan Area) exchange database. It is to be appreciated that, in less sophisticated embodiments, all of the above databases need not be included. However, for enhanced accuracy, all of the above databases may be included. Further databases may also be included to further enhance the reliability of the validation process.

In addition to any one or more of the above databases, the subscriber line validation system may be in communication via a conventional communication channel with an off-site or, in some embodiments, on-site line identification database (LIDB) host. The LIDB host may include a line number portability (LNP) database. In one exemplary embodiment, the LNP database may have a front end access to a plurality of LIDBs. The LNP database may however be a separate database. An example subscriber line validation system may communicate the subscriber line number to the LIDB host, which, in turn, may communicate reference subscriber data (e.g., in a form of LIDB codes) back to the subscriber line validation system for processing. The subscriber line validation system may then process the LIDB codes to provide the merchant with validation data relating to the subscriber line. The subscriber line validation system may be used to identify telephone numbers being served by CLECs in order to ensure that calls are routed correctly on ported lines.

Broadly, the subscriber line validation system may have a variety of different components, including a communications module, and a processor module. The a processor module includes the various databases, the comparator module, the validity check module, and an interrogation module for interrogating the LIDB host. It is to be appreciated that the aforementioned modules may be defined by one or more servers with associated databases. The LIDB host may comprise many different LIDB databases maintained by various LECs and, accordingly, may be distributed among various different geographic locations.

Figure 4:
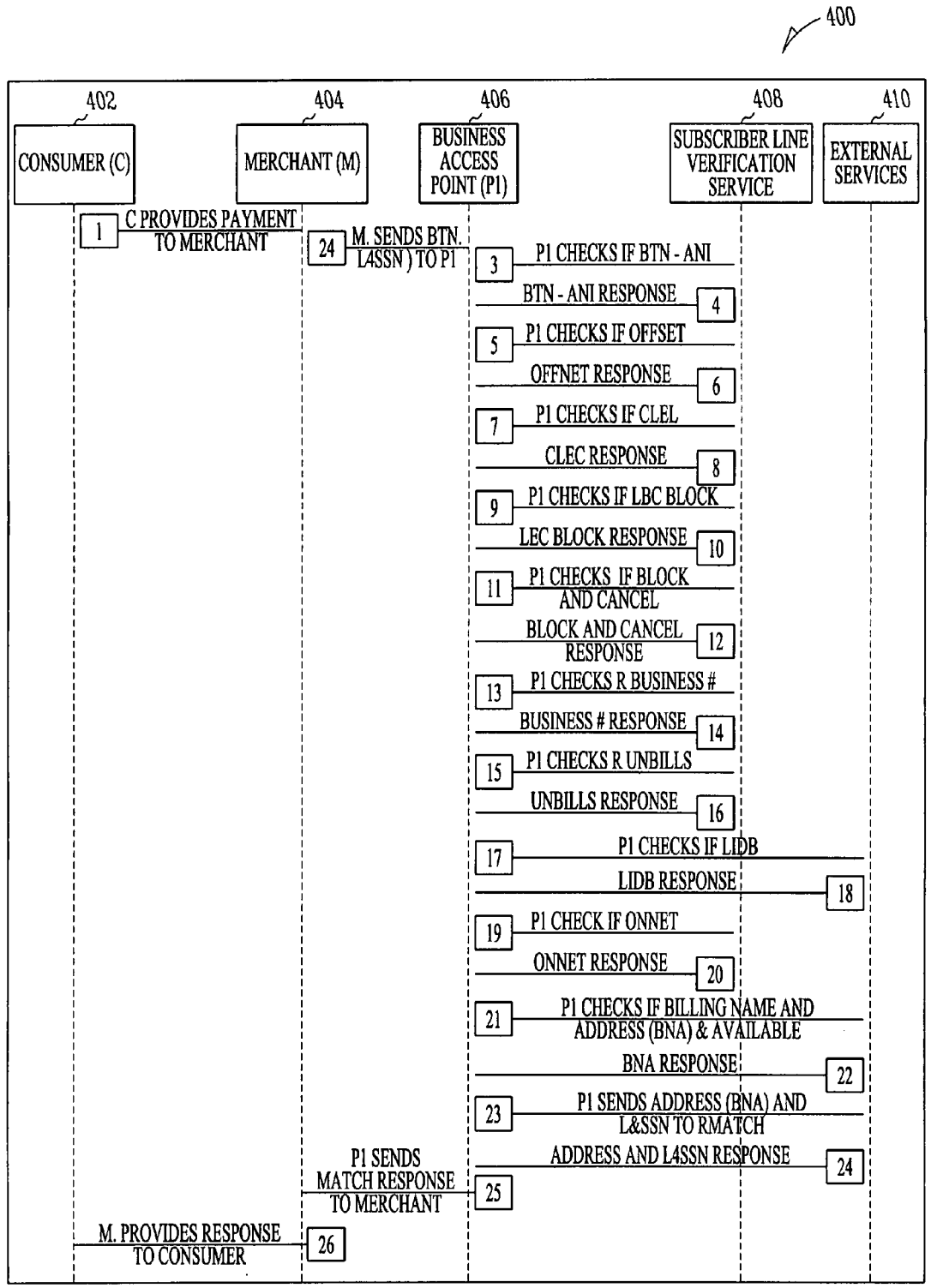
FIG. 4 is a sequence diagram illustrating an identity verification system being utilized in conjunction with a subscriber line validation process, in accordance with an example embodiment.

Referring in particular to FIG. 4 of the drawings, a sequence diagram is shown illustrating providing to a merchant verification of the identity of a user in conjunction with a validation of a subscriber line. In one exemplary embodiment, a consumer 402 provides payment information to a merchant 404 (operation 1) along with a transaction authorization request. The merchant 404 initiates a request to a business access point 406 to validate a subscriber line and to verify the identity of the consumer 402 (operation 2).

As shown in FIG. 4, operations 3 through 18 are directed to the subscriber line validation based on the billing telephone number provided by the merchant 404 to the business access point 406. The business access point 406 provides the billing telephone number to a subscriber line validation system 408 (operation 3). The subscriber line validation system 408 first determines whether the subscriber line is associated with an Automatic Number Identification (ANI). In the example of FIG. 4 the billing telephone number provided by the merchant 404 is associated with ANI (operation 4).

It will be noted that the business access point 406 and the subscriber line validation system 408 may be associated with a single business entity, e.g., a business entity that is in control of the network-based transaction facility 120 of FIG. 1. The business access point 406 requests the subscriber line validation system 408 to interrogate its OFFNET database (operation 5) in order to determine whether the industry standard NPA/NXX and operating company number (OCN) of the subscriber line is present in the OFFNET database. The OFFNET database includes NPA/NXX and OCN combinations of operating companies, with which the proprietor or user of the subscriber line validation system 408 does not have billing and collection agreements to bill into the telephone company's bill page associated with the subscriber line. Accordingly, the proprietor or user of the subscriber line validation system is unable to include a charge in the account associated with the subscriber line on behalf of the merchant for the transaction carried out with the merchant via the subscriber line.

If the line number is in the OFFNET database, then the processor module of the subscriber line validation system 408 generates an indication that the NPA/NXX and OCN for the subscriber line number are not billable. The response associated with the interrogation of the OFFNET database is communicated to the business access point 406 (operation 6).

Thereafter, the business access point 406 requests the subscriber line validation system 408 to interrogate the CLEC database (operation 7) to determine whether the line number is found in a known CLEC table in the CLEC database. CLEC numbers are those line numbers that are known to have ported to a CLEC and, accordingly, the proprietor of the subscriber line validation system is thus unable to route these line numbers to the correct billing entities. If the line number is found in the CLEC database, then the processor module generates a code indicating that the line number is not billable for the CLEC and thus the transaction cannot be charged to the subscriber account associated with the subscriber line. The response associated with the interrogation of the CLEC database is communicated to the business access point 406 (operation 8).

The business access point 406 requests the subscriber line validation system 408 to interrogate the LEC BLOCK database (operation 9) to determine whether the subscriber of the line number has requested a billing block. The response associated with the interrogation of the LEC BLOCK database is communicated to the business access point 406 (operation 10). The business access point 406 requests the subscriber line validation system 408 to interrogate the BLOCK and CANCEL database (operation 11) to determine whether the subscriber of the line number has requested that a service be cancelled or blocked from further billing. The response associated with the interrogation of the BLOCK and CANCEL database is communicated to the business access point 406 (operation 12).

Next, the business access point 406 requests the subscriber line validation system 408 to determine (operation 13) whether the billing telephone number is a business telephone number. The response associated with this determination is communicated to the business access point 406 (operation 14). The business access point 406 requests the subscriber line validation system 408 to interrogate the UNBILLS database (operation 15) to determine whether the billing telephone number is associated with any unpaid bills. The response associated with the interrogation of the UNBILLS database is communicated to the business access point 406 (operation 16).

The processing described in the abovementioned operations may be utilized to conduct a preliminary investigation into the subscriber line number or ANI to provide an initial indication of whether or not the ANI corresponds with a billable subscriber line. Once the initial investigation has been conducted, in certain embodiments, the subscriber line validation system then uses the ANI to obtain reference subscriber line data in the form of LIDB codes from one or more industry standard databases, e.g. the LIDB host. The business access point 406 requests external services 410 to interrogate the LIDB database or host (operation 17). The response associated with the interrogation of the LIDB database or host is communicated to the business access point 406 (operation 18). The business access point 406 requests the subscriber line validation system 408 to interrogate the ONNET database (operation 19). The ONNET database provides the merchant/client and product specific billable information. A subscriber line number may be billable for certain products. The ONNET database looks at the specific clients that have been approved by each NPA/NXX and OCN and the products that they have been approved to bill. The response associated with the interrogation of the ONNET database is communicated to the business access point 406 (operation 20).

As shown in FIG. 4, operations 21 through 25 are directed to validation of the identity of a user based on the billing telephone number and the last four digits of a social security number provided by the merchant 404 to the business access point 406. The business access point 406 initiates a request to external services 410 to obtain street address information associated with the billing telephone number (operation 21). The street address information is communicated back to the business access point 406 (operation 22). The business access point 406 provides the obtained street address and the last four digits of a social security number provided by the merchant 404 to external services 410 (operation 23). In response, the external services 410 provide a response indicating whether any identification records match the street address and the last four digits of a social security number (operation 24).

The business access point 406 performs matching operations, as discussed with reference to FIG. 3, and communicates a response to the merchant 404 (operation 25), based on the outcome of the matching operations. The response may include an indication of a positive authentication of the user or an indication of a failed authentication of the user. The merchant 404 may then communicate to the consumer 402 a positive or a negative response to the user's transaction authorization request (operation 26).

FIG. 5 is a diagrammatic representation of an example data structure 500 to represent an identity verification request that may be utilized by the identity verification system 200 of FIG. 2, in accordance with an example embodiment. As shown in FIG. 5, the example data structure 500 comprises fields 502 through 512.

"REQUEST_TRANSACTION.ACCT_ID" field 502 is used to represent account identification information associated with the client (e.g., a merchant or a consumer). "REQUEST_TRANSACTION.CLIENT_ID" field 504 is used to represent an identification number assigned to the client by the identity verification service. "REQUEST_TRANSACTION.BTN" field 506 is used to represent the billing telephone number provided by the client. "REQUEST_TRANSACTION.BTN_VAL" field 508 is used to indicate whether the subscriber line associated with the billing telephone number is to be validated in addition to validation the identity of a user. "REQUEST_TRANSACTION.L4SSN" field 510 is used to represent the last four digits of the user's social security number. "REQUEST_TRANSACTION.ADDR_RULE" field 512 is used to indicate a rule to be utilized for street address detection.

It will be noted, that an identity verification system request, as well as other information utilized by the identity verification system 200 of FIG. 2, may be represented utilizing a variety of techniques that may be available to a person skilled in the art.

Figure 6:
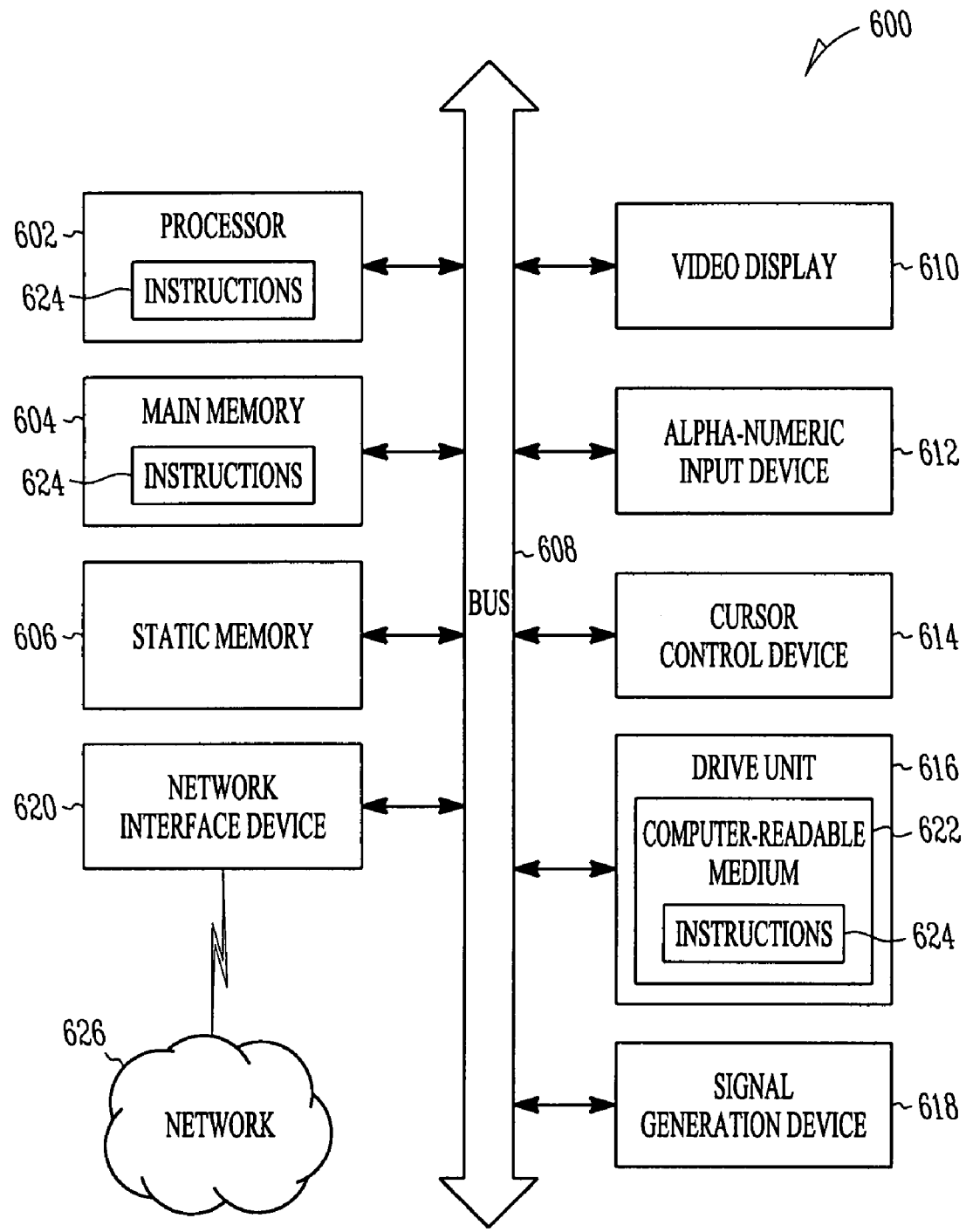
FIG. 6 is a diagrammatic representation of an example machine in the form of a computer system within which a set of instructions, for causing the machine to perform any one or more of the methodologies discussed herein, may be executed.

FIG. 6 shows a diagrammatic representation of a machine in the example form of a computer system 600 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alpha-numeric input device 612 (e.g., a keyboard), a user interface (UI) navigation device 614 (e.g., a cursor control device), a disk drive unit 616, a signal generation device 618 (e.g., a speaker) and a network interface device 620.

The disk drive unit 616 includes a machine-readable medium 622 on which is stored one or more sets of instructions and data structures (e.g., software 624) embodying or utilized by any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

The software 624 may further be transmitted or received over a network 626 via the network interface device 620 utilizing any one of a number of well-known transfer protocols (e.g., Hyper Text Transfer Protocol (HTTP)).

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of embodiments of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware.

Thus, a method and system to verify the identity of a user have been described. Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

The invention claimed is:

1. An identity verification system provided to verify the identity of a user associated with a phone bill that can be used as a payment method, the system comprising:
a processor; and
a memory including instructions which cause the processor to implement:
a communications module configured to receive, at a verification computer system, a billing telephone number and a user-supplied private data segment, the user-supplied private data segment corresponding to a date of birth of a user, wherein the billing telephone number indicates that a user has selected an associated phone bill as a payment method;
an address detector configured to use the received billing telephone number to obtain, from an address service computer system, a street address associated with the user;
a private data processing module configured to obtain, from a personal data computer system, one or more identification records, utilizing the obtained street address; and
a matching module configured to compare the one or more identification records obtained from the personal data computer system with the user-supplied private data segment to generate a match result, the address service computer system and the personal data computer system being third party computer systems.

2. The system of claim 1, further comprising a business rules engine configured to determine whether the match result corresponds to a positive authentication of the user.

3. The system of claim 2, wherein the business rules engine is in communication with a configuration module, the configuration module configured to identify authentication criteria.

4. The system of claim 3, wherein the authentication criteria comprises a partial match.

5. The system of claim 1, further comprising an authentication response generator configured to generate an authentication message based on the match result.

6. The system of claim 5, wherein the authentication message is indicative of positive authentication, the positive authentication being based on a partial match of a record from the one or more identification records with the user-supplied private data segment corresponding to the date of birth of the user.

7. The system of claim 5, wherein the authentication message is indicative of positive authentication, the positive authentication being based on an exact match of a record from the one or more identification records with the user-supplied private data segment corresponding to the date of birth of the user.

8. The system of claim 5, wherein the authentication message is indicative of a failed authentication.

9. The system of claim 8, wherein the communications module is configured to automatically initiate an alternative identity verification procedure in response to the failed authentication.

10. The system of claim 9, wherein the alternative identity verification procedure comprises initiating a telephone call to the billing telephone number.

11. The system of claim 1, further including a billing number validation interface to obtain validation of a telephone line account associated with the billing telephone number as a valid payment method for the user.

12. The system of claim 1, wherein:
the communications module is configured to receive the street address associated with the user and communicate the street address associated with the user to the private data processing module.

13. A computer-implemented method of verifying the identity of a user associated with a phone bill that can be used as a payment method, the method comprising:
receiving, at a network-based transaction facility, a billing telephone number and a user-supplied private data segment, the user-supplied private data segment corresponding to a date of birth of a user, wherein the billing telephone number indicates that a user has selected an associated phone bill as a payment method;
obtaining a street address associated with the user from an address service hosted by an address service system, using the received billing telephone number;
obtaining one or more identification records from a personal data matching service hosted by a personal data matching service system, utilizing the obtained street address; and
comparing, using one or more processors, the one or more identification records with the user-supplied private data segment corresponding to the date of birth of the user to generate a match result, the address service system and the personal data matching service system being third party computer systems.

14. The method of claim 13, further comprising determining whether the match result corresponds to a positive authentication of the user.

15. The method of claim 14, wherein the comparing of the one or more identification records with the user-supplied private data segment comprises identifying authentication criteria.

16. The method of claim 15, wherein the authentication criteria comprises a partial match.

17. The method of claim 13, further comprising generating an authentication message based on the match result.

18. The method of claim 17, wherein the generating of the authentication message comprises generating an authentication message indicative of positive authentication, the positive authentication being based on a partial match of a record from the one or more identification records with the data segment corresponding to the date of birth of the user.

19. The method of claim 17, wherein the generating of the authentication message comprises generating an authentication message indicative of positive authentication, the positive authentication being based on an exact match of a record from the one or more identification records with the user-supplied private data segment corresponding to the date of birth of the user.

20. The method of claim 17, wherein the generating of the authentication message comprises generating an authentication message indicative of a failed authentication.

21. The method of claim 13, further comprising obtaining validation of a telephone line account associated with the billing telephone number as a valid payment method for the user.

22. A machine-readable non-transitory storage medium having instruction data provided to verify the identity of a user associated with a phone bill that can be used as a payment method, wherein the instruction data is executable, by a machine to cause the machine to:
receive, at a verification computer system, a billing telephone number and a user-supplied private data segment, the user-supplied private data segment corresponding to a date of birth of a user, wherein the billing telephone number indicates that a user has selected an associated phone bill as a payment method;
obtain a street address associated with the user from an address service system, using the received billing telephone number
obtain one or more identification records from a personal data matching service system, utilizing the obtained street address; and
compare the one or more identification records with the user-supplied private data segment corresponding to the date of birth of the user to generate a match result, the address service system and the personal data matching service system being third party computer systems.

* * * * *